United States Patent
Fujisaki et al.

(10) Patent No.: US 8,867,834 B2
(45) Date of Patent: Oct. 21, 2014

(54) IMAGE PROCESSING DEVICE, IMAGE PROCESSING METHOD, AND IMAGE PROCESSING PROGRAM

(71) Applicant: OMRON Corporation, Kyoto (JP)

(72) Inventors: Tamio Fujisaki, Siga (JP); Masaaki Yagi, Siga (JP); Masahiro Taniguchi, Kyoto (JP); Yoshiyuki Hagiwara, Siga (JP); Takashi Yamada, Siga (JP); Tomohiko Hinoue, Siga (JP); Takeshi Naito, Siga (JP)

(73) Assignee: OMRON Corporation, Kyoto (JP)

( * ) Notice: Subject to any disclaimer, the term of this patent is extended or adjusted under 35 U.S.C. 154(b) by 74 days.

(21) Appl. No.: 13/780,420

(22) Filed: Feb. 28, 2013

(65) Prior Publication Data

US 2013/0236098 A1 Sep. 12, 2013

(30) Foreign Application Priority Data

Mar. 9, 2012 (JP) ................................. 2012-053467

(51) Int. Cl.
*G06K 9/00* (2006.01)
*G06T 7/00* (2006.01)

(52) U.S. Cl.
CPC ..... *G06T 7/0081* (2013.01); *G06T 2207/20144* (2013.01); *G06T 2207/10048* (2013.01); *G06T 2207/20008* (2013.01); *G06T 2207/20148* (2013.01)
USPC ........................................................ 382/171

(58) Field of Classification Search
USPC ................... 382/103, 171, 173, 209; 348/143
See application file for complete search history.

(56) References Cited

U.S. PATENT DOCUMENTS 5,901,246 A * 5/1999 Hoffberg et al. ............... 382/209

FOREIGN PATENT DOCUMENTS

JP 2006-101384 A 4/2006

* cited by examiner

*Primary Examiner* — Duy M Dang
(74) *Attorney, Agent, or Firm* — Osha Liang LLP (57) ABSTRACT

An image processing device has an image input part to which a frame image of an imaging area taken with an infrared camera is input, a background model storage part in which a background model is stored with respect to each pixel of the frame image input to the image input part, a frequency of a pixel value of the pixel being modeled in the background model, a background difference image generator that determines whether each pixel of the frame image input to the image input part is a foreground pixel or a background pixel using the background model of the pixel, which is stored in the background model storage part, and generates a background difference image, and a threshold setting part.

20 Claims, 7 Drawing Sheets

IMAGE PROCESSING DEVICE, IMAGE PROCESSING METHOD, AND IMAGE PROCESSING PROGRAM

BACKGROUND

1. Technical Field

The present invention relates to an image processing device, an image processing method, and an image processing program, which process an frame image of an imaging area imaged with an infrared camera and generates a background difference image.

2. Related Art

Conventionally, a monitoring system that monitors an invasion of a suspicious person or a left suspicious object using imaging devices, such as a video camera, is in practical use. In this kind of monitoring system, an imaging area of the imaging device is adjusted to a monitoring target area where the invasion of the suspicious person or the left suspicious object is monitored. The monitoring system also includes an image processing device that processes the frame image of the monitoring target area imaged with the imaging device and detects imaged objects, such as the suspicious person and the suspicious object.

Using a background model, the image processing device determines whether each pixel of the input frame image is a background pixel in which a background is imaged or a foreground pixel in which the object except the background is imaged. Based on a determination result, the image processing device generates a background difference image (a binary image) in which a background region where the background is imaged and a foreground region where objects, such as a person and a vehicle, are imaged are separated from each other. The foreground region of the background difference image is the region where the object is imaged.

On the other hand, a visible light camera cannot image the object that is of a detection target in a relatively dark place because of an insufficient exposure amount. Therefore, for example, Japanese Unexamined Patent Publication No. 2006-101384 proposes a device that processes the frame image (a thermal image) taken with a far-infrared camera and detects the imaged person.

In a configuration of the device disclosed in Japanese Unexamined Patent Publication No. 2006-101384, a binary image is generated by dividing each pixel of the thermal image taken by the far-infrared camera into a pixel located within a range between an upper limit threshold and a lower limit threshold of a luminance value (a pixel value) corresponding to a temperature of a person and a pixel located outside the range, and the imaged person is detected.

However, contrasts of objects, such as the person and the vehicle, which are imaged in the frame image taken with the far-infrared camera are degraded because the person and the vehicle that are of the detection target objects is rainy in the rainfall time. Therefore, even if objects, such as the person and the vehicle, which are imaged in the frame image taken with the far-infrared camera can be detected in fine weather or cloudiness, sometimes the objects cannot be detected in the rainfall time.

Sometimes a change in weather of the imaging area of the far-infrared camera degrades detection accuracy of objects, such as the person and the vehicle, which are imaged in the frame image taken with the far-infrared camera.

SUMMARY

One or more embodiments of the present invention provides an image processing device, an image processing method, and an image processing program, which can suppress the degradation of the detection accuracy of objects, such as the person and the vehicle, which are imaged in the frame image of the imaging area taken with the infrared camera, with the change in weather of the imaging area of the infrared camera.

In accordance with one or more embodiments of the present invention, an image processing device is configured as follows.

A frame image of an imaging area taken with an infrared camera is input to an image input part. For example, the infrared camera takes 10 to 60 frame images per second, and inputs the frame images to the image input part.

A background model storage part stores a background model with respect to each pixel of the frame image input to an image input part, a frequency of a pixel value of the pixel being modeled in the background model. For example, a frequency of a pixel value of each pixel of the frame image input in past times is modeled in the background model, and the background model is expressed by a Gaussian density function. The background model may be updated using the frame image every time the frame image is input to the image input part.

A background difference image generator determines whether each pixel of the frame image input to the image input part is a foreground pixel or a background pixel using the background model of the pixel, which is stored in the background model storage part, and generates a background difference image. Specifically, for each pixel of the frame image input to the image input part, the background difference image generator determines that the pixel is the background pixel when the frequency in the background model of the pixel is greater than a threshold. On the other hand, the background difference image generator determines that the pixel is the foreground pixel when the frequency in the background model of the pixel is less than the threshold. That is, the background difference image generator determines that the pixel in which the frequency at which the pixel value emerges is less than the threshold is the foreground pixel, and determines that the pixel in which the frequency at which the pixel value emerges is greater than the threshold is the background pixel.

A threshold setting part sets a threshold, the threshold being used by the background difference image generator to determine whether each pixel of the frame image input to the image input part is the foreground pixel or the background pixel. The threshold setting part calculates and sets the threshold based on a distribution of a pixel value of the pixel that is determined to be the background pixel by the background difference image generator.

The pixel value of the pixel, in which a road surface determined to be the background pixel is imaged, concentrates on a certain value because the road surface is rainy in the rainfall time. A degree in which the pixel value of the pixel, in which the road surface determined to be the background pixel is imaged, concentrates on a certain value increases because a rainy level of the road surface becomes substantially even with increasing rainfall amount. The degree is obtained from a variance of the distribution of the pixel value of the pixel that is determined to be the background pixel by the background difference image generator.

For example, the threshold setting part calculates and sets the threshold based on a distribution of a pixel value of the pixel that is determined to be the background pixel by the background difference image generator, thereby setting the threshold according to the rainfall amount. The threshold setting part may decrease the threshold of the frequency, which is used to determine whether the pixel is the background pixel or the foreground pixel, with increasing rainfall amount.

Therefore, the degradation of the accuracy of the determination whether each pixel of the frame image input to the image input part is the foreground pixel in which the object is imaged or the background pixel in which the object is not imaged according to the change in weather of the imaging area of the infrared camera can be suppressed. Accordingly, the degradation of the detection accuracy of objects, such as the person and the vehicle, which are imaged in the frame image of the imaging area taken with the infrared camera, with the change in weather of the imaging area of the infrared camera can be suppressed.

The image processing device may include an object detector that detects the imaged object from the background difference image generated by the background difference image generator.

In the image processing device, the threshold setting part may calculate and set the threshold using the pixel that is determined to be the background pixel by the background difference image generator and the pixel value of the pixel located in a threshold calculation region that is previously set with respect to the frame image input to the image input part.

In this case, the region that is rainy in the rainfall time may be set to a threshold calculation region. In other words, the region that is not rainy in the rainfall time by providing a roof may be excluded from the threshold calculation region. Therefore, the threshold can be set according to the rainfall amount.

The following configuration may be added in order to prevent sunlight reflected by a puddle or metal from being falsely detected as the object.

The image processing device includes a mirror pixel value storage part in which a range of a pixel value of a mirror pixel is stored, and a mirror pixel determination part that determines whether each pixel of the frame image input to the image input part is the mirror pixel based on the range of the pixel value, which is stored in the mirror pixel value storage part. The image processing device also includes a mirror region setting part that sets a mirror region with respect to the frame image input to the image input part based on a distribution of the mirror pixel.

The object detector is configured not to detect the imaged object with respect to the mirror region set by the mirror region setting part. Therefore, the sunlight reflected by the puddle or the metal can be prevented from being falsely detected as the object.

According to one or more embodiments of the present invention, the mirror pixel determination part determines the pixel, in which the pixel value in the frame image input to the image input part exists within the range of the pixel value of the mirror pixel stored in the mirror pixel value storage part for a predetermined first time, to be the mirror pixel. Therefore, the pixel in which a noise is temporarily generated and the pixel in which the sunlight and the like reflected by the object is temporarily imaged can be prevented from being determined to be the mirror pixel.

According to one or more embodiments of the present invention, the mirror pixel determination part determines the pixel determined to be the mirror pixel to be not the mirror pixel when the pixel value in the frame image input to the image input part exists outside the range of the pixel value of the mirror pixel stored in the mirror pixel value storage part for a predetermined second time. The determination that the mirror pixel is not the mirror pixel due to the temporary noise can be prevented.

Whether the object detected by the object detector is the person or objects, such as the vehicle except the person may be determined. In this case, the image processing device may include an object class determination part that determines whether the object is a person based on a distribution of the pixel value of each pixel located in the foreground region set by the object detector.

For the person, because an amount of radiation heat depends on a region of a human body, the pixel value of the pixel in which the person is imaged is dispersed to some extent. On the other hand, for the object that is not the person, because the amount of radiation heat is even as a whole, the pixel value of the pixel in which the object that is not the person is imaged concentrates on a certain value. Accordingly, whether the object is the person can be determined from the distribution of the pixel value of the pixel corresponding to the detected object.

The determination that the object is not imaged in the region may be made when a size of the detected object is smaller than a predetermined size. The object that is not continuously detected from the frame image input to the image input part for a predetermined third time may not be detected as the imaged object.

According to one or more embodiments of the present invention, the degradation of the detection accuracy of objects, such as the person and the vehicle, which are imaged in the frame image of the imaging area taken with the infrared camera, with the change in weather of the imaging area of the infrared camera can be suppressed.

DETAILED DESCRIPTION

An image processing device according to embodiments of the present invention will be described below. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
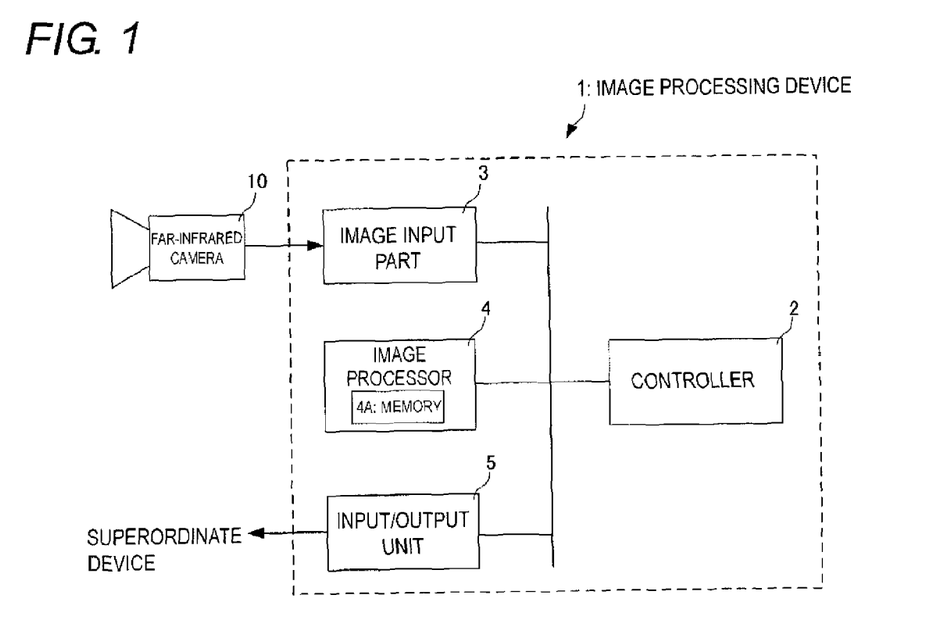
FIG. 1 is a block diagram illustrating a configuration of a main portion of an image processing device.

FIG. 1 is a block diagram illustrating a configuration of a main portion of the image processing device. An image processing device 1 includes a controller 2, an image input part 3, an image processor 4, and an input/output unit 5.

The controller 2 controls an operation of each part of a main body of the image processing device 1.

A frame image taken with a far-infrared camera 10 is input to the image input part 3. The far-infrared camera 10 is placed such that a monitoring target area where invasions of objects, such as a person and a vehicle, are monitored falls within an imaging area. The far-infrared camera 10 takes 10 to 60 frame images per second, and inputs the frame images to the image input part 3.

The image processor 4 processes the frame image, which is input to the image input part 3, and detects the object (an object that is not a background) taken in the frame image. The image processor 4 includes a memory 4a in which a background model is stored. The background model is used to process the frame image input to the image input part 3. The image processor 4 updates the background model stored in the memory 4a using the frame image input to the image input part 3. A range of a pixel value of a pixel determined to be a mirror pixel, a mirror pixel setting checking time (that corresponds to the first time according to one or more embodiments of the present invention), a mirror pixel setting cancel checking time (that corresponds to the second time according to one or more embodiments of the present invention), an object detection checking time (that corresponds to the third time according to one or more embodiments of the present invention), and pieces of data (that correspond to the threshold, the mirror region, and the foreground region) generated in operating time are also stored in the memory 4a.

The image processor 4 includes a microcomputer that performs image processing to the frame image input to the image input part 3. An image processing program according to one or more embodiments operates the microcomputer, and is installed in advance.

The input/output unit 5 controls input/output of data to and from a superordinate device (not illustrated). When the image processor 4 detects the object, the input/output unit 5 outputs a signal that notifies the superordinate device of the object detection. The input/output unit 5 may be configured to output the signal notifying the superordinate device of the object detection, or the input/output unit 5 may be configured to output a signal notifying the superordinate device of the object detection together with the frame image in which the object is detected. The input/output unit 5 may be configured to transmit the frame image (the frame image input to the image input part 3) taken with the far-infrared camera 10 to the superordinate device.

When notified of the object detection located in the monitoring target area by a signal output from the input/output unit 5 of the image processing device 1, the superordinate device may be configured to notify a staff of the object detection by sound and the like. Alternatively, the superordinate device may be configured to display the frame image on a display device when the frame image in which the object is detected is transmitted. Alternatively, a recording device in which the frame image taken with the far-infrared camera 10 is recorded is provided to check the frame image as needed basis.

Various pieces of data stored in the memory 4a will be described below.

First the background model will be described. The background model is modeling for a frequency (an occurrence probability) of a pixel value in each pixel of the frame image input to the image input part 3. Specifically, using most recent n frame images input to the image input part 3, the frequency (the occurrence probability) of the pixel value is modeled in each pixel of the frame image by a mixture Gaussian distribution. The background model of each pixel of the frame image input to the image input part 3 is stored in the memory 4a. The image processor 4 updates the background model of each pixel every time the frame image is input to the image input part 3. There are well known various background model generating methods, such as a method for generating the background model using all the pixels (the foreground pixel and the background pixels) and a method for generating the background model using only the background pixels (with no use of the foreground pixels). Therefore, the description of the background model generating method is omitted. The background model generating method may be selected from the well-known background model generating methods according to a characteristic of the far-infrared camera 10 and an imaging environment.

Figure 2:
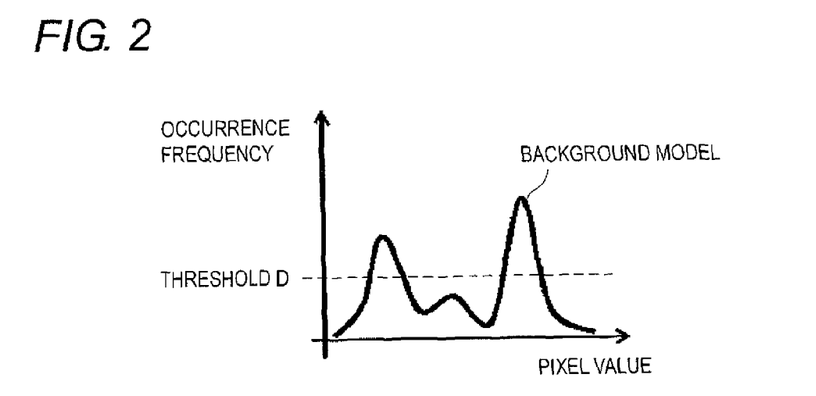
FIG. 2 is a view illustrating a background model of a certain pixel.

FIG. 2 is a view illustrating the background model of a certain pixel. In FIG. 2, a horizontal axis indicates the pixel value, and a vertical axis indicates the frequency (the occurrence probability). A threshold D in FIG. 2 is a boundary value that is used to determine whether the pixel is the background pixel or the foreground pixel. The image processor 4 processes the frame image that is taken at a clock time t with the far-infrared camera 10 using the background model, which is generated using the n frame images taken between clock times t−1 and t−n with the far-infrared camera 10.

In the background model of the pixel of the frame image input to the image input part 3, the image processor 4 determines that the pixel is the background pixel when the frequency of the pixel value of the pixel is greater than or equal to the threshold D, and the image processor 4 determines that the pixel is the foreground pixel when the frequency of the pixel value of the pixel is less than the threshold D. The pixels of the frame image input to the image input part 3 are equal to one another in the threshold D. The threshold D is stored in the memory 4a. The image processor 4 has a function of calculating the threshold D from the frame image input to the image input part 3 and setting the threshold D (updating the threshold D stored in the memory 4a). The processing of setting the threshold D is described in detail later.

Figure 3:
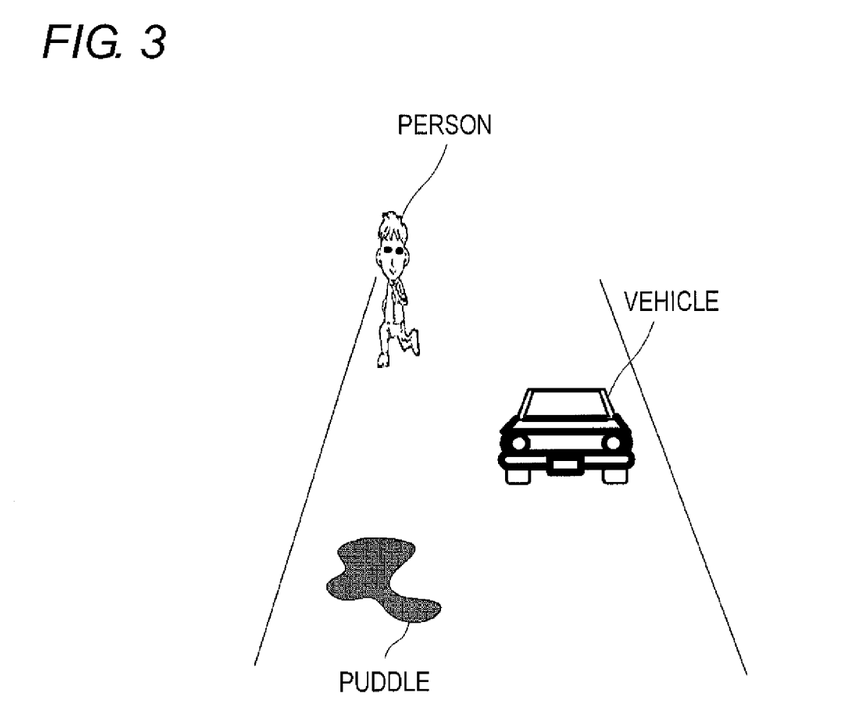
FIG. 3 is a view illustrating an imaging area of a far-infrared camera.

A range of the pixel value of the pixel determined to be a mirror pixel will be described below. A lower limit and an upper limit of the pixel value determined to be the mirror pixel are stored in the memory 4a of the image processor 4. As used herein, the mirror pixel means a pixel in which sunlight reflected by a puddle or metal is imaged. For example, in the case that a puddle exists in the monitoring target area that is of the imaging area of the far-infrared camera 10 as illustrated in FIG. 3, the mirror pixel is the pixel in which the sunlight reflected by the puddle is imaged. The mirror pixel becomes the pixel value corresponding to a far-infrared energy amount of the reflected sunlight. Therefore, the mirror pixel is determined to be the foreground pixel when a background difference image is generated.

The pixel value of the mirror pixel is close to the pixel value of the pixel in which midair is imaged. The sunlight reflected by the puddle or the metal is imaged with the far-infrared camera 10 in not cloudiness or rainy weather but fine weather. This is because the sunlight to which the puddle or the metal is exposed is scattered by cloud. Therefore, in this example, using the frame image in which the midair is imaged with the far-infrared camera 10 during the fine weather, the lower limit and the upper limit of the pixel value of the pixel determined to be the mirror pixel are fixed based on a distribution of the number of pixels to the pixel value, and stored in the memory 4a in advance.

Figure 4:
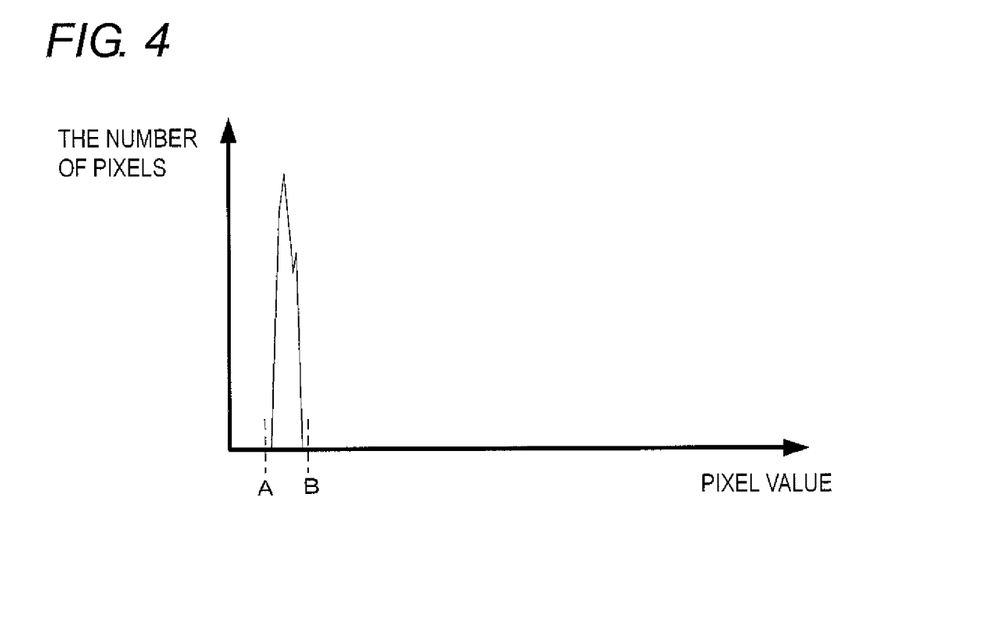
FIG. 4 is a view illustrating a distribution of the number of pixels to a pixel value in a frame image in which a fair sky is imaged with a far-infrared camera.

During the fine weather, a fair sky emits the very low far-infrared energy. In the frame image in which the fair sky is imaged with the far-infrared camera 10, the distribution of the number of pixels to the pixel value concentrates on the very low pixel value as illustrated in FIG. 4. In FIG. 4, the horizontal axis indicates the pixel value, and the vertical axis indicates the number of pixels. In the example in FIG. 4, a pixel value A is the lower limit of the pixel value of the pixel determined to be the mirror pixel, and a pixel value B is the upper limit of the pixel value of the pixel determined to be the mirror pixel.

The lower limit A and the upper limit B of the pixel value of the pixel determined to be the mirror pixel are fixed by the frame image of the fair sky imaged with the far-infrared camera 10. Accordingly, the lower limit A and the upper limit B are fixed in consideration of the characteristic of the far-infrared camera 10 and the environment of the imaging area that is of the monitoring target area. The lower limit A and the upper limit B of the pixel value of the pixel determined to be the mirror pixel, which are stored in the memory 4a, may be updated at proper intervals, such as one week and one month.

A mirror pixel setting checking time, a mirror pixel setting cancel checking time, and an object detection checking time, which are stored in the memory 4a, are set to several seconds (one to three seconds). The mirror pixel setting checking time, the mirror pixel setting cancel checking time, and the object detection checking time may be identical to or different from one another. However, according to one or more embodiments of the present invention, the object detection checking time may be greater than or equal to the mirror pixel setting checking time. When the object detection checking time is greater than or equal to the mirror pixel setting checking time, false detection of the mirror region as the object can be prevented before the pixel is determined to be the mirror region.

The mirror pixel setting checking time, the mirror pixel setting cancel checking time, and the object detection checking time may be configured to be set by the number of frame images. For example, when the far-infrared camera 10 is configured to output 10 frame images per second, not one second (the time) but 10 frames (the number of frame images) may be set.

Figure 5:
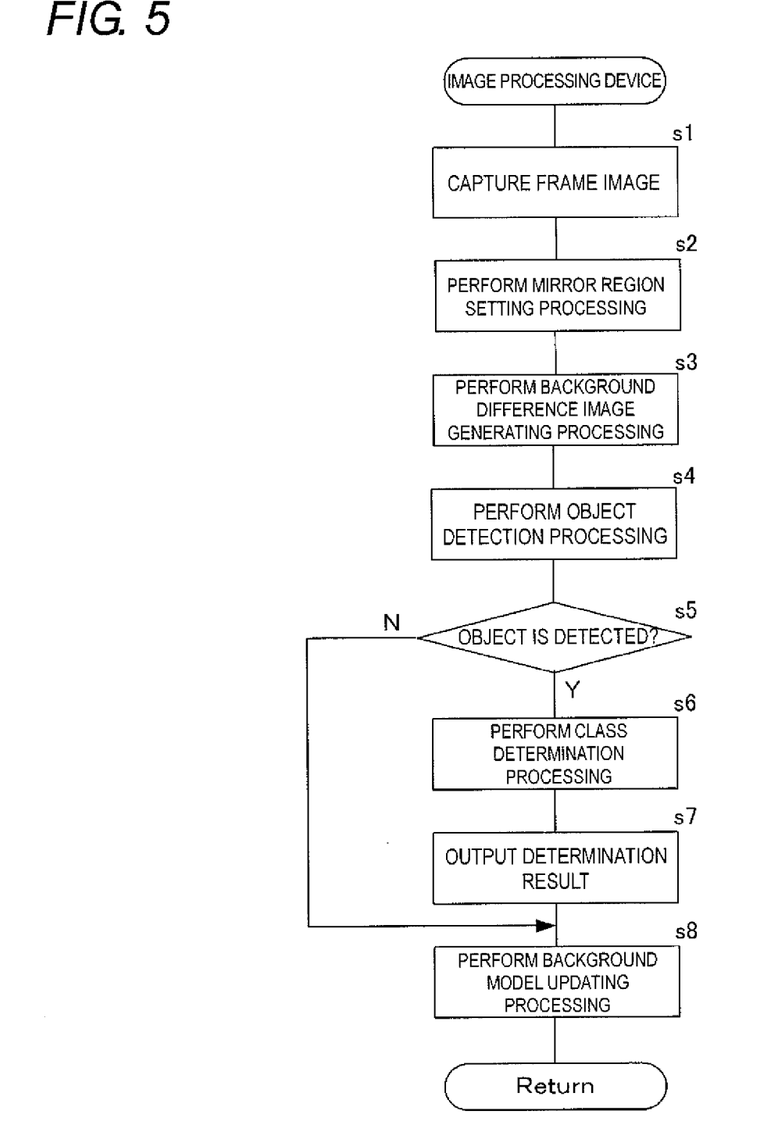
FIG. 5 is a flowchart illustrating an operation of the image processing device.

An operation of the image processing device will be described below. At this point, an outline of the operation of the image processing device 1 will be described, and then each operation will be described in detail below. FIG. 5 is a flowchart illustrating an operation of the image processing device.

The far-infrared camera 10 inputs the frame image in which the imaging area is taken to the image input part 3. The image processor 4 captures the frame image input to the image input part 3 (one frame) (s1). The image processor 4 captures the frame image input to the image input part 3 in the order input, and repeats the following processing.

The image processor 4 performs mirror region setting processing of setting the mirror region, in which the sunlight reflected by the puddle or the metal is imaged, to the currently-captured frame image (s2). In s2, sometimes the mirror region is not set to the currently-captured frame image, and sometimes one or plural mirror regions are set to the currently-captured frame image.

The image processor 4 performs background difference image generating processing of generating a background difference image to the currently-captured frame image (s3).

The image processor 4 performs object detection processing of detecting the object imaged in the currently-captured frame image from the background difference image generated in s3 (s4). In s4, sometimes the object is not detected, and sometimes one or plural objects are detected.

When detecting the object imaged in the currently-captured frame image in s4, the image processor 4 performs class determination processing of determining whether the object is a person or an article except the person in each object detected in s4 (s5 and s6). The image processing device 1 outputs a determination result of s6 from the input/output unit 5 (s7), and the image processing device 1 notifies the superordinate device of the object detection.

When the determination that the object is not detected is made in s5, the image processing device 1 performs processing in s8 without performing pieces of processing in s6 and s7.

Using the frame image currently captured in s1, the image processor 4 performs background model updating processing of updating the background model stored in the memory 4a using the frame image (s8). Then the processing returns to s1. In s8, the background model is updated with respect to each pixel of the frame image.

The update of the background model is not limited to a specific technique, but any well-known technique may be used as described above.

The image processing device 1 repeats the processing in FIG. 5.

Figure 6:
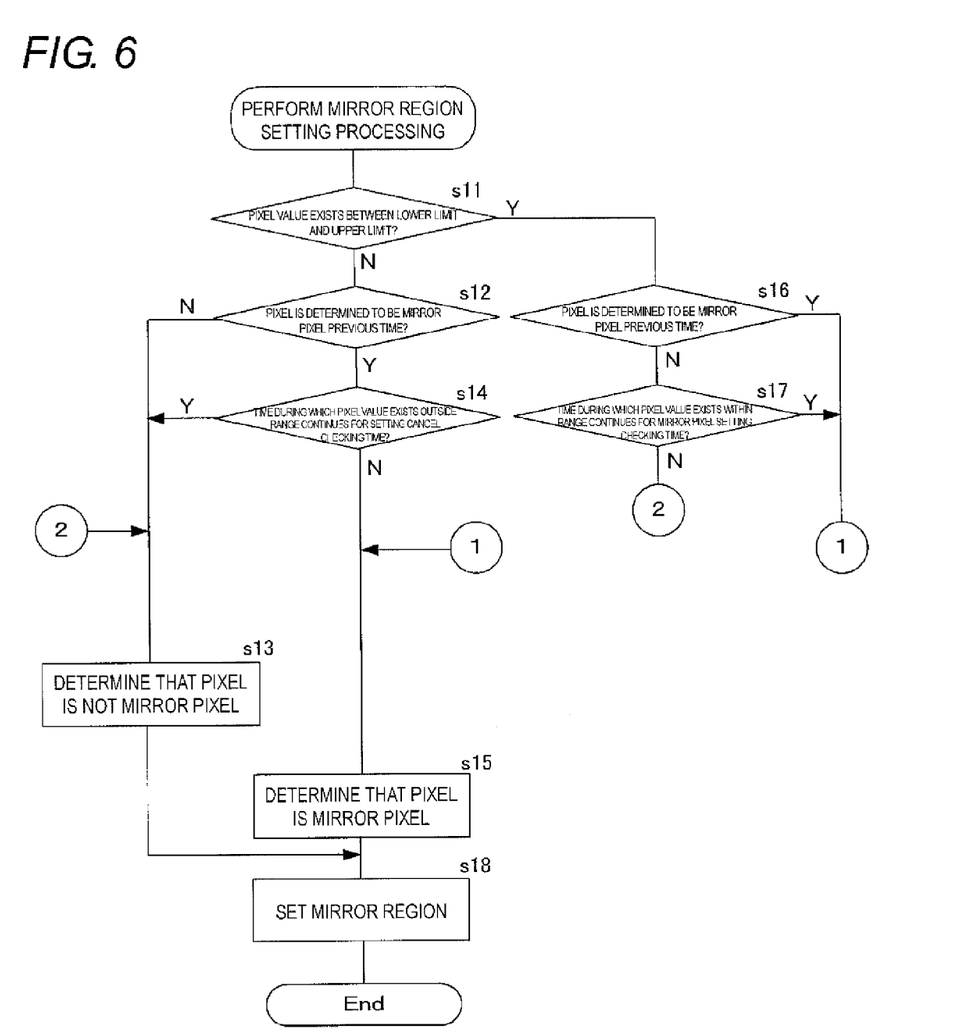
FIG. 6 is a flowchart illustrating mirror pixel region setting processing.

The mirror region setting processing in s2 will be described in detail below. FIG. 6 is a flowchart illustrating the mirror region setting processing.

The image processor 4 determines whether the pixel is the mirror pixel by performing the following pieces of processing in s11 to s17 to each pixel of the frame image currently captured in s1.

The image processor 4 determines whether the pixel value of the determination target pixel of the mirror pixel exists within a range between the lower limit A and the upper limit B of the mirror pixel, which are stored in the memory 4a (s11). When determining that the pixel value does not exist within the range between the lower limit A and the upper limit B in s11, the image processor 4 determines whether the pixel is the pixel that is determined to be the mirror pixel in the frame image captured previous time (s12). When determining that the pixel is the pixel that is determined to be not the mirror pixel in the frame image captured previous time, the image processor 4 determines that the pixel is not the mirror pixel (s13).

When determining that the pixel is the pixel that is determined to be the mirror pixel in the frame image captured previous time, the image processor 4 determines whether a time during which the pixel value of the pixel exists outside the range between the lower limit A and the upper limit B continues for the mirror pixel setting cancel checking time (s14). The image processor 4 counts a duration time during which the pixel value of the pixel determined to be the mirror pixel exists outside the range between the lower limit A and the upper limit B of the mirror pixel. The count value is stored in the memory 4a.

When the time during which the pixel value of the pixel exists outside the range between the lower limit A and the upper limit B continues for the mirror pixel setting cancel checking time, the image processor 4 determines that the pixel is not the mirror pixel in s13. On the other hand, when the time during which the pixel value of the pixel exists outside the range between the lower limit A and the upper limit B does not continue for the mirror pixel setting cancel checking time, the image processor 4 determines that the pixel is the mirror pixel (s15).

For the pixel that is determined to be the pixel in which the pixel value exists within the range between the lower limit A and the upper limit B, the image processor 4 determines whether the pixel is the pixel that is determined to be the mirror pixel in the frame image captured previous time (s16). When determining that the pixel is the pixel that is determined to be the mirror pixel in the frame image captured previous time, the image processor 4 determines that the pixel is the mirror pixel in s15.

When determining that the pixel is the pixel that is determined to be not the mirror pixel in the frame image captured previous time, the image processor 4 determines whether the time during which the pixel value of the pixel exists within the range between the lower limit A and the upper limit B continues for the mirror pixel setting checking time (s17). The image processor 4 counts the duration time during which the pixel value of the pixel determined to be not the mirror pixel exists within the range between the lower limit A and the upper limit B of the mirror pixel. The count value is stored in the memory 4a.

When the time during which the pixel value of the pixel exists within the range between the lower limit A and the upper limit B continues for the mirror pixel setting checking time, the image processor 4 determines that the pixel is the mirror pixel in s15. On the other hand, when the time during which the pixel value of the pixel exists within the range between the lower limit A and the upper limit B does not continue for the mirror pixel setting checking time, the image processor 4 determines that the pixel is not the mirror pixel in s13.

Thus, when the time during which the pixel value of each pixel of the frame image exists within the range between the lower limit A and the upper limit B continues for the mirror pixel setting checking time, the image processor 4 determines that the pixel is the mirror pixel. When the time during which the pixel value of each pixel of the frame image exists outside the range between the lower limit A and the upper limit B continues for the mirror pixel setting cancel checking time, the image processor 4 determines that the pixel is not the mirror pixel.

Accordingly, the image processor 4 does not determine that the pixel in which the pixel value exists temporarily within the range between the lower limit A and the upper limit B is the mirror pixel. The image processor 4 does not determine that the pixel in which the pixel value exists temporarily outside the range between the lower limit A and the upper limit B is the mirror pixel.

The image processor 4 sets the mirror region on the currently-captured frame image based on the distribution of the pixel determined to be the mirror pixel in s15 (s18). In s18, a region where the mirror pixels gather together is set to the mirror region. Therefore, sometimes the set mirror region includes the pixel that is determined to be not the mirror pixel through the above processing. The image processor 4 stores the mirror region set in s18 in the memory 4a. For example, in the frame image, the region where the puddle in FIG. 3 is imaged is set to the mirror region, and stored in the memory 4a.

In the pixel, which is included in the set mirror region and determined to be not the mirror pixel, the determination result is maintained.

Figure 7:
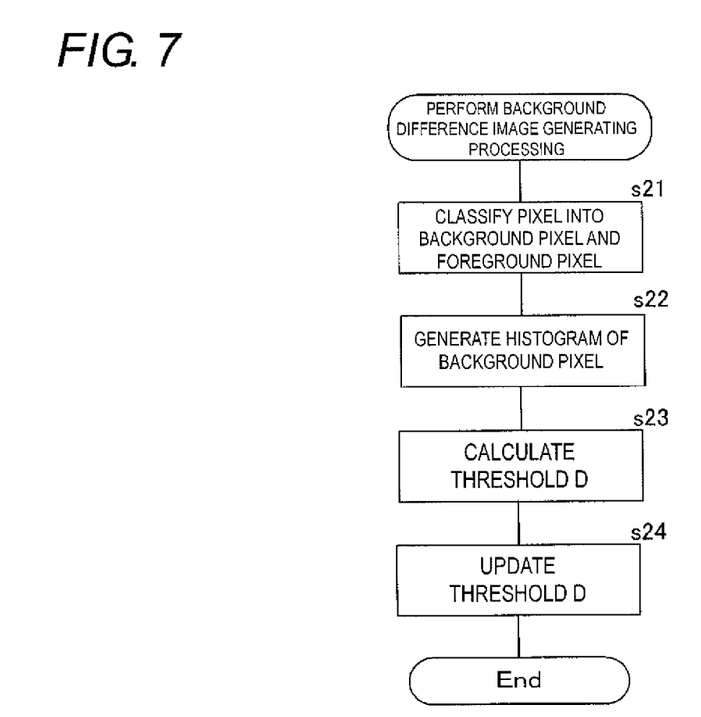
FIG. 7 is a flowchart illustrating background difference image generating processing.
Figure 8A:
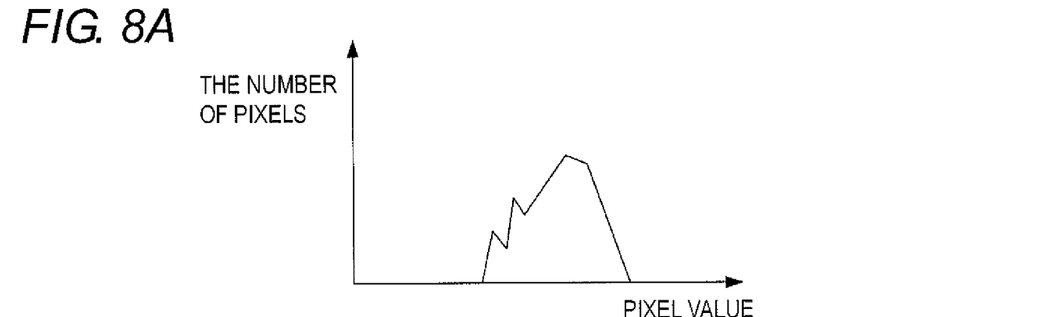
FIGS. 8A to 8D are histograms illustrating a distribution of the pixel value with respect to a background pixel.
Figure 8B:
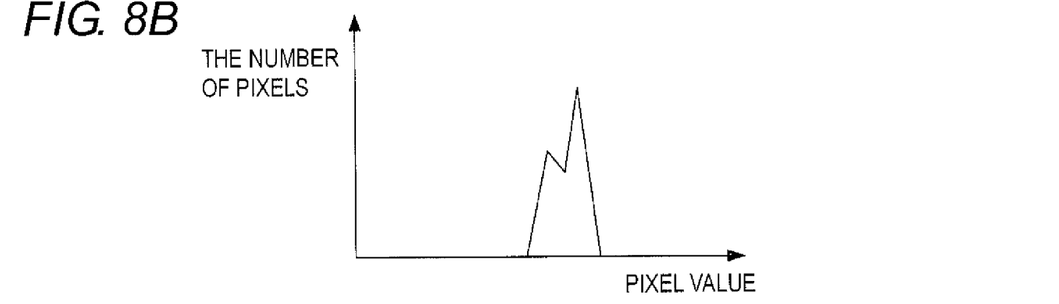
Figure 8C:
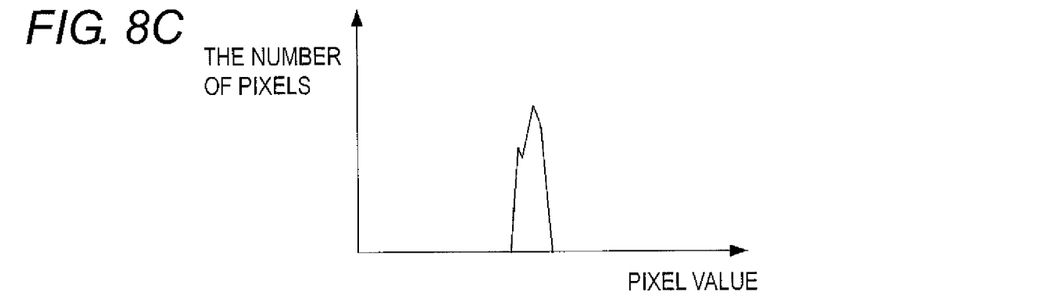
Figure 8D:
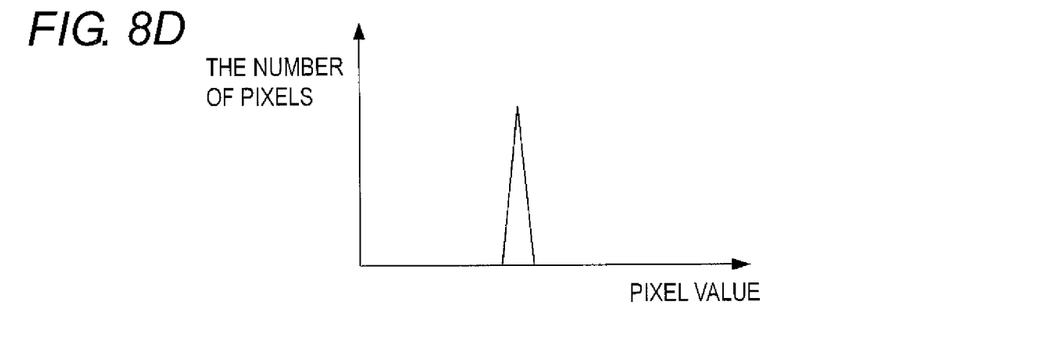

The background difference image generating processing in s3 will be described in detail below. FIG. 7 is a flowchart illustrating the background difference image generating processing.

The image processor 4 determines whether each pixel except the mirror region set through the above processing in the frame image currently captured in s1 is the foreground pixel or the background pixel (s21). In other words, the determination of the foreground pixel or the background pixel is not made to the pixel in the mirror region set through the above processing. The image processor 4 makes the determination of the foreground pixel or the background pixel using the background model stored in the memory 4a and the threshold D.

The image processor 4 generates a histogram illustrating the distribution of the pixel value with respect to the pixel determined to be the background pixel in s21 (s22). In other words, the image processor 4 generates the histogram with no use of the pixel located in the mirror region set in s18 and the pixel determined to be the foreground pixel in s21.

FIG. 8 is a histogram illustrating the distribution of the pixel value of the background pixel in the frame image. FIG. 8A is a histogram when the sunlight hits (a daytime during the fine weather), and FIG. 8B is a histogram when the sunlight does not hit (a time period from the evening to the morning or the cloudiness). However, backgrounds, such as a road surface, are not rainy in FIGS. 8A and 8B. FIGS. 8C and 8D are histograms in a rainfall time, and backgrounds, such as a road surface, are rainy in FIGS. 8C and 8D. FIG. 8D illustrates the state in which a rainfall amount is greater than that in FIG. 8C. in FIGS. 8A to 8D, the horizontal axis indicates the pixel value, and the vertical axis indicates the number of pixels.

As illustrated in FIGS. 8A to 8D, because the road surface that is of the background is rainy in the rainfall time, the pixel values of the background pixels concentrates on a certain value. A degree in which the pixel value of the pixel, in which the road surface determined to be the background pixel is imaged, concentrates on a certain value increases because a rainy level of the road surface becomes substantially even with increasing rainfall amount (a variance $\delta$ of the histogram decreases).

On the other hand, because objects, such as the person and the vehicle, which are of the foreground, are also rainy in the rainfall time like the road surface that is of the background, not only the background pixel but also the pixel value of the foreground pixel decreases.

The image processor 4 calculates the threshold D based on the variance $\delta$ generated in s22 (s23). Specifically, the threshold D is fixed as a value calculated from threshold $D=\alpha-\beta/\delta$ ($\alpha$ and $\beta$ are values previously and individually set).

The threshold D decreases with decreasing variance $\delta$ of the histogram generated in s22, namely, with increasing rainfall amount.

The image processor 4 updates the threshold D stored in the memory 4a to the value calculated in s23 (s24), and ends the processing.

As is clear from the above description, the threshold D calculated by the currently-captured frame image is used to determine whether each pixel of the currently-captured frame image is the foreground pixel or the background pixel. That is, the threshold D used to determine whether each pixel of the currently-captured frame image is the foreground pixel or the background pixel is the value calculated by the frame image captured previous time.

Thus, the threshold D is set in substantially real time according to a change in weather of the imaging area of the far-infrared camera 10. Accordingly, accuracy of the determination whether each pixel of the frame image taken with the far-infrared camera 10 is the foreground pixel or the background pixel can be prevented from being lowered according to the change in weather of the imaging area of the far-infrared camera 10.

In the above description, the pixel located in the mirror region set in s18 and the pixel determined to be the foreground pixel in s21 are not used when the histogram is generated in s22. For example, in the case that the region that is not rainy in the rainfall time exists because a roof is provided in the imaging target area of the far-infrared camera 10, the region that is rainy in the rainfall time may be set to the threshold calculation region. In this case, the histogram may be generated by the pixel, which is located in the set threshold calculation region and determined to be the background pixel in s21.

Figure 9:
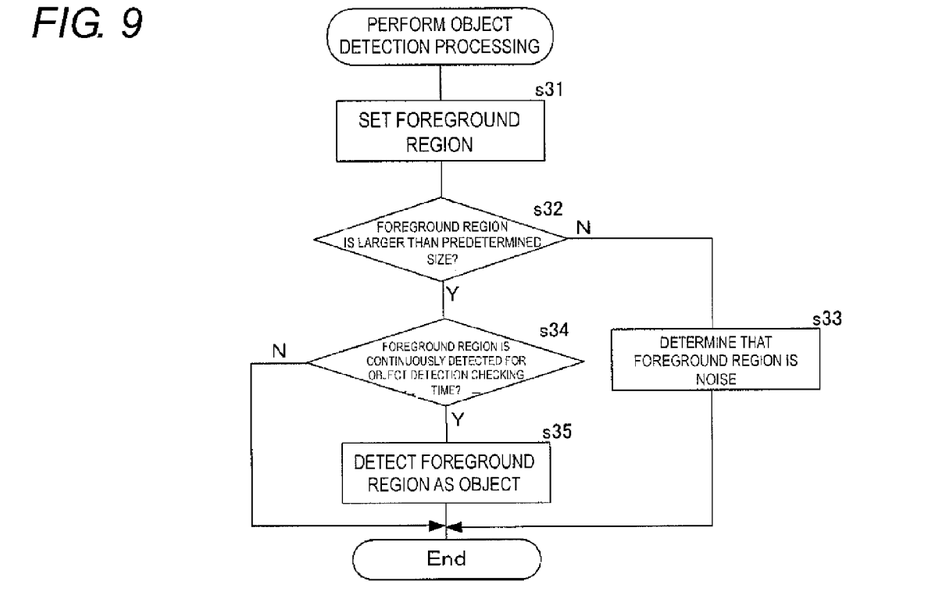
FIG. 9 is a flowchart illustrating object detection processing.

The object detection processing in s4 will be described in detail below. FIG. 9 is a flowchart illustrating the object detection processing.

The image processor 4 sets the foreground region on the currently-captured frame image based on the distribution of the pixel determined to be the foreground pixel in s21 (s31). In s31, the region where the foreground pixels gather together is set to the foreground region. Therefore, sometimes the set foreground region includes the pixel that is determined to be the background pixel in the above processing. The image processor 4 stores the foreground region set in s31 in the memory 4a. For example, in the frame image, the region where the vehicle or the person in FIG. 3 is imaged is individually set to the foreground region and stored in the memory 4a.

The image processor 4 determines whether each foreground region set in s31 is larger than a predetermined size (s32), and the image processor 4 determines that the foreground region smaller than the predetermined size is a noise (s33). In s33, the image processor 4 determines that the object is not imaged in the foreground region (the foreground region smaller than the predetermined size).

On the other hand, the image processor 4 determines whether each foreground region determined to be larger than the predetermined size in s32 is continuously detected for the object detection checking time stored in the memory 4a (s34). The image processor 4 detects the foreground region, which is continuously detected for the object detection checking time in s34, as the object (s35). The image processor 4 counts the duration time set to the frame image in each foreground region determined to be larger than the predetermined size in s32. The count value is stored in the memory 4a.

The image processor 4 does not detect the foreground region, which is not continuously detected for the object detection checking time, as the object, and does not determine that the foreground region is the noise.

Therefore, the image processor 4 detects the object, which remains in the imaging area of the far-infrared camera 10 for the object detection checking time, as the object. Accordingly, the image processor 4 can be prevented from detecting a bird or an insect, which flies near an imaging lens of the far-infrared camera 10, as the object.

As described above, the object detection checking time is set to be larger than the mirror pixel setting checking time, the image processor 4 can be prevented from detecting the mirror region as the object before the mirror region is set in s18.

Figure 10:
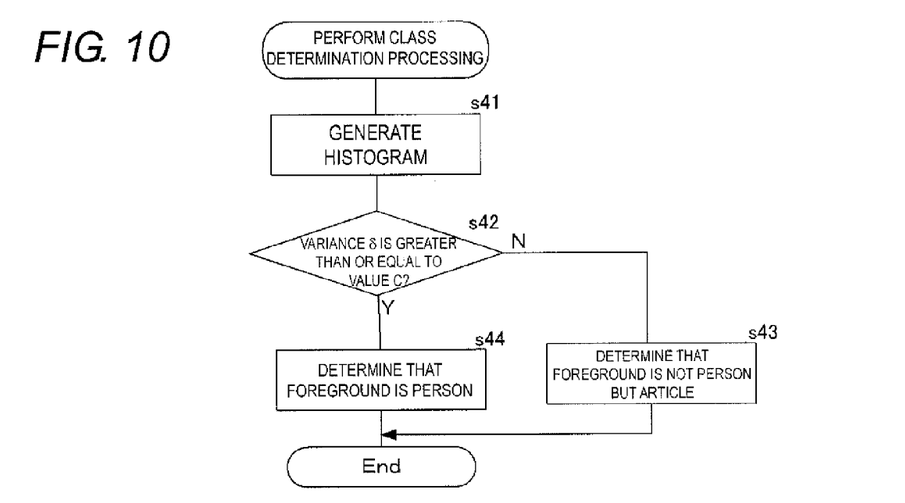
FIG. 10 is a flowchart illustrating class determination processing.

The class determination processing in s6 will be described in detail below. FIG. 10 is a flowchart illustrating the class determination processing.

The image processor 4 generates the histogram illustrating the distribution of the pixel value of the pixel in each foreground region detected as the object in s35 (s41). A surface of each of objects, such as the vehicle, substantially evenly emits the far-infrared energy because the surface of the object is made of a substantially homogeneous material. Therefore, the foreground region that is each of the objects, such as the vehicle, has the relatively small variance δ of the histogram illustrating the distribution of the pixel value.

On the other hand, for the person, the radiation amount of the far-infrared energy depends on a region of a human body, and both a portion in which clothes or a rain cape is in close contact with a skin and a portion in which the clothes or the rain cape is separated from the skin exist even if the person gets wet with rain. Therefore, the person has the relatively large variance δ of the histogram illustrating the distribution of the pixel value.

When the variance δ of the histogram generated in s41 is greater than or equal to a predetermined value C, the image processor determines that the foreground region is the person. When the variance δ is less than the predetermined value C, the image processor determines that the foreground region is not the person but the article (s42 to s44). In the class determination processing, the class may be determined in consideration of the size and the like of the foreground region.

The value C used in the determination is also stored in the memory 4a.

Thus, the image processing device 1 calculates and updates the threshold D, which is used to determine whether the pixel is the foreground pixel or the background pixel, according to the change in weather of the imaging area of the far-infrared camera 10. Accordingly, the accuracy of the determination whether each pixel of the frame image taken with the far-infrared camera 10 is the foreground pixel or the background pixel can be prevented from being lowered according to the change in weather of the imaging area of the far-infrared camera 10. As a result, the foreground region is properly set in the frame image taken with the far-infrared camera 10, so that the accuracy of the detection of the person or the vehicle, which is imaged in the frame image of the imaging area taken with the far-infrared camera 10 can be prevented from being lowered according to the change in weather of the imaging area of the far-infrared camera 10.

Because the image processor 4 does not determine whether the pixel in the set mirror region is the foreground pixel or the background pixel, the mirror region is not falsely detected as the object.

The image processor 4 determines the class of the detected object using the variance δ of the histogram illustrating the distribution of the pixel value of the pixel in the foreground region, so that whether the detected object is the person can be determined with high accuracy.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processing device comprising:
   an image input part to which a frame image of an imaging area taken with an infrared camera is input;
   a background model storage part in which a background model is stored with respect to each pixel of the frame image input to the image input part, a frequency of a pixel value of the pixel being modeled in the background model;
   a background difference image generator that determines whether each pixel of the frame image input to the image input part is a foreground pixel or a background pixel using the background model of the pixel, which is stored in the background model storage part, and generates a background difference image; and
   a threshold setting part that sets a threshold, the threshold being used by the background difference image generator to determine whether each pixel of the frame image input to the image input part is the foreground pixel or the background pixel, wherein the background difference image generator determines that each pixel of the frame image input to the image input part is the background pixel when a frequency in the background model of the pixel is greater than the threshold set by the threshold setting part, and the background difference image generator determines that the pixel is the foreground pixel when the frequency is less than the threshold, and wherein the threshold setting part calculates and sets the threshold based on a distribution of a pixel value of the pixel that is determined to be the background pixel by the background difference image generator.

2. The image processing device according to claim 1, wherein the threshold setting part calculates and sets the threshold based on a variance of the distribution of the pixel value of the pixel that is determined to be the background pixel by the background difference image generator.

3. The image processing device according to claim 2, wherein the threshold setting part calculates and sets the threshold using the pixel that is determined to be the background pixel by the background difference image generator and the pixel value of the pixel located in a threshold calculation region that is previously set with respect to the frame image input to the image input part.

4. The image processing device according to claim 2, further comprising:
an object detector that detects the imaged object from the background difference image generated by the background difference image generator.

5. The image processing device according to claim 1, wherein the threshold setting part calculates and sets the threshold using the pixel that is determined to be the background pixel by the background difference image generator and the pixel value of the pixel located in a threshold calculation region that is previously set with respect to the frame image input to the image input part.

6. The image processing device according to claim 5, further comprising:
an object detector that detects the imaged object from the background difference image generated by the background difference image generator.

7. The image processing device according to claim 1, further comprising:
an object detector that detects the imaged object from the background difference image generated by the background difference image generator.

8. The image processing device according to claim 7, further comprising:
a mirror pixel value storage part in which a range of a pixel value of a mirror pixel is stored;
a mirror pixel determination part that determines whether each pixel of the frame image input to the image input part is the mirror pixel based on the range of the pixel value, which is stored in the mirror pixel value storage part; and
a mirror region setting part that sets a mirror region with respect to the frame image input to the image input part based on a determination result of the mirror pixel determination part,
wherein the object detector does not detect the imaged object with respect to the mirror region set by the mirror region setting part.

9. The image processing device according to claim 8, wherein the mirror pixel determination part determines the pixel, in which the pixel value in the frame image input to the image input part exists within the range of the pixel value of the mirror pixel stored in the mirror pixel value storage part for a predetermined first time, to be the mirror pixel.

10. The image processing device according to claim 9, wherein the mirror pixel determination part determines the pixel determined to be the mirror pixel to be not the mirror pixel when the pixel value in the frame image input to the image input part exists outside the 11. The image processing device according to claim 9, wherein the object detector sets a foreground region where the object is imaged based on the foreground pixel in the background difference image generated by the background difference image generator.

12. The image processing device according to claim 8, wherein the mirror pixel determination part determines the pixel determined to be the mirror pixel to be not the mirror pixel when the pixel value in the frame image input to the image input part exists outside the range of the pixel value of the mirror pixel stored in the mirror pixel value storage part for a predetermined second time.

13. The image processing device according to claim 8, wherein the object detector sets a foreground region where the object is imaged based on the foreground pixel in the background difference image generated by the background difference image generator.

14. The image processing device according to claim 7, wherein the object detector sets a foreground region where the object is imaged based on the foreground pixel in the background difference image generated by the background difference image generator.

15. The image processing device according to claim 14, further comprising:
an object class determination part that determines whether the object is a person based on a distribution of the pixel value of each pixel located in the foreground region set by the object detector.

16. The image processing device according to claim 14, wherein the object detector determines that the object is not imaged in the set foreground region when the foreground region is smaller than a predetermined size.

17. The image processing device according to claim 14, wherein the object detector continuously detects the object, which is imaged in the frame image input to the image input part, for a predetermined third time.

18. The image processing device according to claim 7, further comprising:
an object detector that detects the imaged object from the background difference image generated by the background difference image generator. range of the pixel value of the mirror pixel stored in the mirror pixel value storage part for a predetermined second time.

19. An image processing method for generating a background difference image by processing a frame image of an imaging area, the imaging area being taken with an infrared camera and input to an image input part, the image processing method comprising:
a background difference image generating step of determining whether each pixel of the frame image input to the image input part is a foreground pixel or a background pixel using a background model in which a frequency of a pixel value of the pixel is modeled, the background model being stored in a background model storage part, and generating a background difference image; and
a threshold setting step of setting a threshold, the threshold being a reference used in the background difference image generating step of determining whether each pixel of the frame image input to the image input part is the foreground pixel or the background pixel, wherein, in the background difference image generating step, a determination that each pixel of the frame image input to the image input part is the background pixel is made when a frequency in the background model of the pixel is greater than the threshold set by the threshold setting part, and a determination that the pixel is the foreground pixel when the frequency is less than the threshold, and in the threshold setting step, the threshold is calculated and set based on a distribution of a pixel value of the pixel, which is determined to be the background pixel in the background difference image generating step.

20. A non-transitory computer readable medium storing an image processing program that causes a computer to perform image processing of generating a background difference image by processing a frame image of an imaging area, the imaging area being taken with an infrared camera and input to an image input part, the image processing program causing the computer to perform:

a background difference image generating step of determining whether each pixel of the frame image input to the image input part is a foreground pixel or a background pixel using a background model in which a frequency of a pixel value of the pixel is modeled, the background model being stored in a background model storage part, and generating the background difference image; and a threshold setting step of setting a threshold, the threshold being a reference used in the background difference image generating step of determining whether each pixel of the frame image input to the image input part is the foreground pixel or the background pixel, wherein, in the background difference image generating step, a determination that each pixel of the frame image input to the image input part is the background pixel is made when a frequency in the background model of the pixel is greater than the threshold set by the threshold setting part, and a determination that the pixel is the foreground pixel when the frequency is less than the threshold, and wherein, in the threshold setting step, the threshold is calculated and set based on a distribution of a pixel value of the pixel, which is determined to be the background pixel in the background difference image generating step.

* * * * *

UNITED STATES PATENT AND TRADEMARK OFFICE
CERTIFICATE OF CORRECTION

PATENT NO.        : 8,867,834 B2
APPLICATION NO.   : 13/780420
DATED             : October 21, 2014
INVENTOR(S)       : Tamio Fujisaki et al.

It is certified that error appears in the above-identified patent and that said Letters Patent is hereby corrected as shown below:

In the Claims:

At column 14, claim number 10, line number 9, "image input part exists outside the" should read, --image input part exists outside the range of the pixel value of the mirror pixel stored in the mirror pixel value storage part for a predetermined second time.--.

Signed and Sealed this
Twenty-fifth Day of August, 2015

Michelle K. Lee
*Director of the United States Patent and Trademark Office*